United States Patent
Lee et al.

(10) Patent No.: US 8,907,645 B2
(45) Date of Patent: Dec. 9, 2014

(54) SAFE ELECTRIC POWER REGULATING CIRCUIT

(75) Inventors: Hsiang-Yu Lee, New Taipei (TW); Ping-Tsun Lin, Taipei (TW)

(73) Assignee: Invention Element Inc., Taoyuan County (TW)

( * ) Notice: Subject to any disclaimer, the term of this patent is extended or adjusted under 35 U.S.C. 154(b) by 447 days.

(21) Appl. No.: 13/284,203

(22) Filed: Oct. 28, 2011

(65) Prior Publication Data

US 2012/0105026 A1    May 3, 2012

(30) Foreign Application Priority Data

Oct. 29, 2010   (TW) ................ 99137195 A

(51) Int. Cl.
G05F 1/56    (2006.01)
H02M 3/158    (2006.01)

(52) U.S. Cl.
CPC .................................. H02M 3/1582 (2013.01)
USPC ............................ 323/282; 323/232; 323/259

(58) Field of Classification Search
USPC .......... 323/222, 223, 225, 232, 259, 263, 282
See application file for complete search history.

(56) References Cited

U.S. PATENT DOCUMENTS

| | | | | |
|---|---|---|---|---|
| 4,184,197 | A * | 1/1980 | Cuk et al. | 363/16 |
| 5,066,900 | A * | 11/1991 | Bassett | 323/224 |
| 5,444,310 | A * | 8/1995 | Kataoka et al. | 307/125 |
| 5,610,807 | A * | 3/1997 | Kanda et al. | 363/43 |
| 5,815,380 | A * | 9/1998 | Cuk et al. | 363/16 |
| 6,232,752 | B1 * | 5/2001 | Bissell | 323/225 |
| 6,429,632 | B1 * | 8/2002 | Forbes et al. | 323/282 |
| 6,486,642 | B1 * | 11/2002 | Qian | 323/259 |
| 7,198,706 | B2 * | 4/2007 | Lewis | 205/725 |
| 8,129,960 | B2 * | 3/2012 | Ito | 323/225 |
| 2010/0181975 | A1 * | 7/2010 | Piselli et al. | 323/282 |
| 2012/0104859 | A1 * | 5/2012 | Nii et al. | 307/66 |

* cited by examiner

*Primary Examiner* — Fred E Finch, III
(74) *Attorney, Agent, or Firm* — Muncy, Geissler, Olds & Lowe, P.C.

(57) ABSTRACT

A safe electric power regulating circuit is connected between a power supply and a voltage boost/buck circuit to regulate the output voltage by the power supply to have a target voltage through the voltage boost/buck circuit. A switching device includes a switch unit, a first diode, and a first capacitor. The switch unit includes a first end, a second end, and a third end. The first end is connected to the power supply, and the second end is connected to the voltage boost/buck circuit. The switch unit is controlled to connect the third end to the first end or the second end. The first diode has an anode connected to the first end of the switch unit. The first capacitor has one end connected to the third end of the switch unit and the other end connected to circuit ground.

10 Claims, 3 Drawing Sheets

SAFE ELECTRIC POWER REGULATING CIRCUIT

CROSS REFERENCE TO RELATED APPLICATION

This application claims the benefits of the Taiwan Patent Application Serial Number 099137195, filed on Oct. 29, 2010, the subject matter of which is incorporated herein by reference.

BACKGROUND OF THE INVENTION

1. Field of the Invention

The present invention relates to the technical field of regulating devices and, more particularly, to a safe electric power regulating circuit for regulating an input voltage to perform voltage buck or boost.

2. Description of Related Art

Power batteries are commonly used as power source for electric vehicles, such as electric bicycles, electric motorcycles, and electric automobiles. A typical power battery has a voltage approximately three to four volts. But according to the type of output power of the motor, the electrical vehicle generally requires a power source of 48-72, 72-200, or 300-700 volts. Accordingly, if power batteries are used as the power source of a motor, the voltage supplied by the power batteries has to be enhanced to exceed the voltage required by the motor.

Currently, a series of tens or hundreds of power batteries are connected to provide high-voltage power for a motor, and a power management circuit is used to control individual battery. When the power of any one of the power batteries is insufficient, the power management circuit disconnects this battery to avoid failure from over-discharging. However, the cost of such power management circuit is very high. To overcome this, a voltage boost circuit is required to enhance the battery voltage up to the required voltage.

FIG. 1 is a circuit diagram of a typical voltage boost circuit. As shown in FIG. 1, the typical voltage boost circuit is comprised of an inductor 91, a switch 92, a diode 93, and a capacitor 94. The switch 92 is controlled to be on in order to make the inductor 91 to ground to generate a large current I to the inductor 91. If the switch 92 is controlled to be off, it will make the inductor 91 to transfer energy of $\frac{1}{2}LI^2$ to the capacitor 94, where L indicates the inductance of the inductor 91.

In practical application, as soon as the current generated by shorted circuit reaches a required magnitude, the switch 92 has to be turned off to avoid the circuit damage from danger caused by over-current. Typically, the energy transfer can be adjusted by controlling the turning-on time of the switch. However, the current generated in such a way increased exponentially in a short period of time, and the transferred energy increased in proportion to a square of the generated current. Therefore, when the control signal of the switch is interfered by low frequency noises, the turning-on time may be too long, resulting in an over-current which causes damages to the entire circuit and makes the electric vehicles to become dangerous.

Therefore, it is desirable to provide an improved safe electric power regulating circuit to mitigate and/or obviate the aforementioned problems.

SUMMARY OF THE INVENTION

The object of the present invention is to provide a safe electric power regulating circuit, which combines a power supply and a voltage boost/buck circuit to regulate an output voltage of the power supply into a target voltage.

To achieve the object, there is provided a safe electric power regulating circuit, which is connected between a power supply and a voltage boost/buck circuit to regulate an output voltage of the power supply into a target voltage. The safe electric power regulating circuit includes: a switch unit having a first end, a second end and a third end, wherein the first end is connected to the power supply, the second end is connected to the voltage boost/buck circuit, and the switching unit is controlled to connect the third end to the first end or the second end; a first diode having an anode connected to the first end of the switch unit; and a first capacitor having one end connected to the third end of the switch unit and the other end connected to circuit ground.

When the switch unit is controlled to connect the third end to the first end, the power supply charges the first capacitor. When the switch unit is controlled to connect the third end to the second end, the first capacitor discharges the voltage boost/buck circuit to complete energy transfer.

Other objects, advantages, and novel features of the invention will become more apparent from the following detailed description when taken in conjunction with the accompanying drawings.

DETAILED DESCRIPTION OF THE PREFERRED EMBODIMENT

Figure 1:
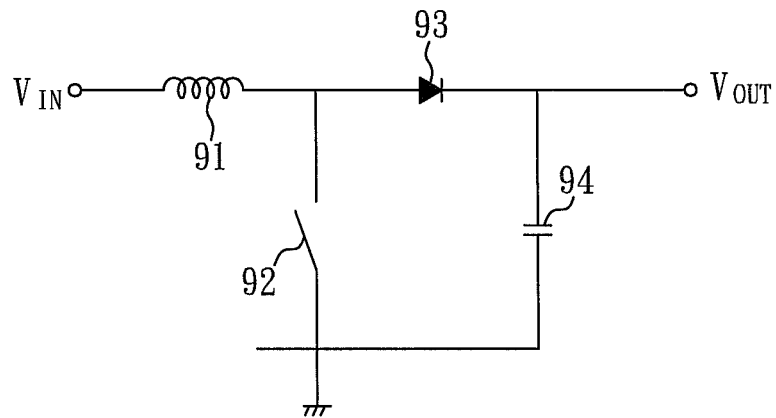
FIG. 1 is a circuit diagram of a typical voltage boost circuit.
Figure 2:
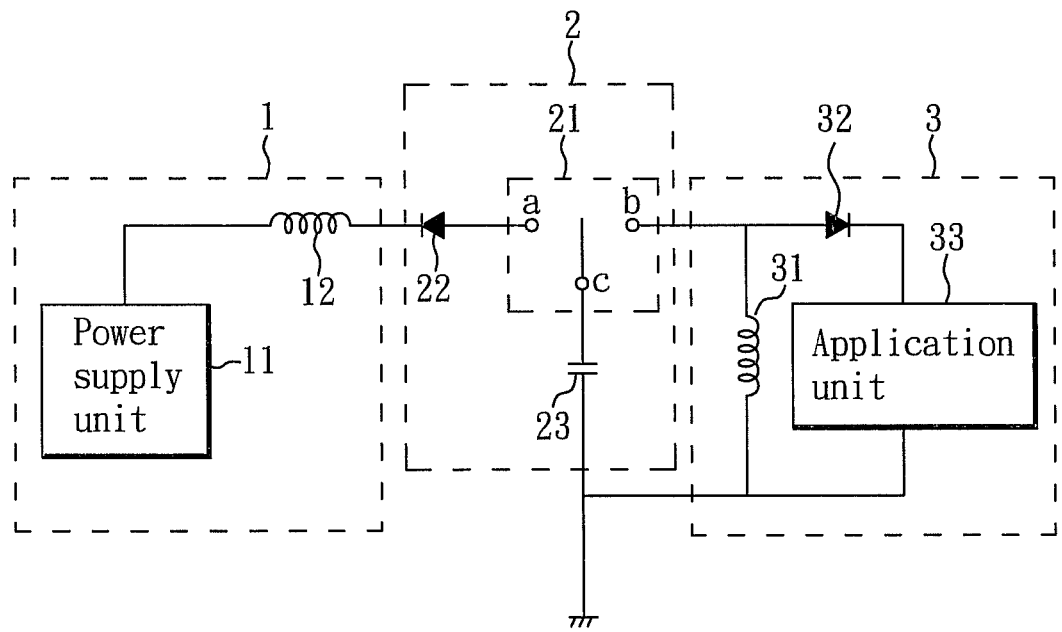
FIG. 2 is a schematic diagram of a safe electric power regulating circuit according to the invention.

FIG. 2 is a schematic diagram of a safe electric power regulating circuit in accordance with the invention. As shown in FIG. 2, the safe electric power regulating circuit 2 is connected between a power supply 1 and a voltage boost/buck circuit 3. The power supply 1 includes a power supply unit 11 and a first inductor 12. The safe electric power regulating circuit 2 includes a switch unit 21, a first diode 22, and a first capacitor 23. The switch unit 21 includes a first end 'a', a second end 'b', and a third end 'c'. The switch unit 21 can be switched to connect the third end 'c' to the first end 'a' or connect the third end 'c' to the second end 'b'. The voltage boost/buck circuit 3 includes a second inductor 31, a second diode 32, and an application unit 33.

The first inductor 12 has two ends respectively connected to the power supply unit 11 and a cathode of the first diode 22. The first end 'a' of the switch unit 21 is connected to the power supply 1, and the second end 'b' thereof is connected to the voltage boost/buck circuit 3. The anode of the first diode 22 is connected to the first end 'a' of the switch unit 21. The first capacitor 23 has one end connected to the third end 'c' of the switch unit 21, and the other end connected to circuit ground.

The second inductor 31 has one end connected to the second end 'b' of the switch unit 21 and the anode of the second diode 32, and the other end connected to circuit ground. The cathode of the second diode 32 is connected to the application unit 33. The power supply unit 11 provides an input voltage, which can be a positive or a negative voltage. The switch unit 21 is controlled to connect the third end 'c' to the first end 'a' or the second end 'b'. The application unit 33 uses a target voltage to perform an application procedure.

FIGS. 3A-3D are schematic diagrams illustrating the operations of the safe electric power regulating circuit 2 according to an embodiment of the invention. As shown in FIGS. 3A-3D, the safe electric power regulating circuit 2 is used to perform a voltage regulation. The power supply unit 11 is a battery unit 111. The application unit 33 is a load 331 having one end connected to the cathode of the second diode 32 and the other end connected to circuit ground. In this embodiment, the voltage provided by the battery unit 111 is regulated for being supplied to the load 331.

In the safe electric power regulating circuit 2 of the present invention, the first diode 22 is provided to limit the direction of the current so as to avoid generating an inverse current flowing back to the power supply unit 11. Accordingly, the connection between the power supply unit 11 and the application unit 33 by the safe electric power regulating circuit 2 is adjusted according to the actual application of the application unit 33. In this embodiment, when the battery unit 111 of the safe electric power regulating circuit 2 is used to provide a target voltage to the load 331 and the target voltage required for the load 331 is a positive voltage, the anode of the battery unit 111 is connected to the circuit ground, and the cathode of the battery unit 111 is connected to the first inductor 12, as shown in FIG. 3A.

In this embodiment, there is further provided a control circuit 4. The control circuit 4 is connected to the switch unit 21 in order to send a switching signal to the switch unit 21 for performing a control. The control circuit 4 is preferably a feedback circuit connected to the load 331 for controlling the switch unit 21 according to the voltage of the load 331 so as to deactivate the switch unit 21 when the voltage of the load 331 reaches to the required voltage.

Figure 3A:
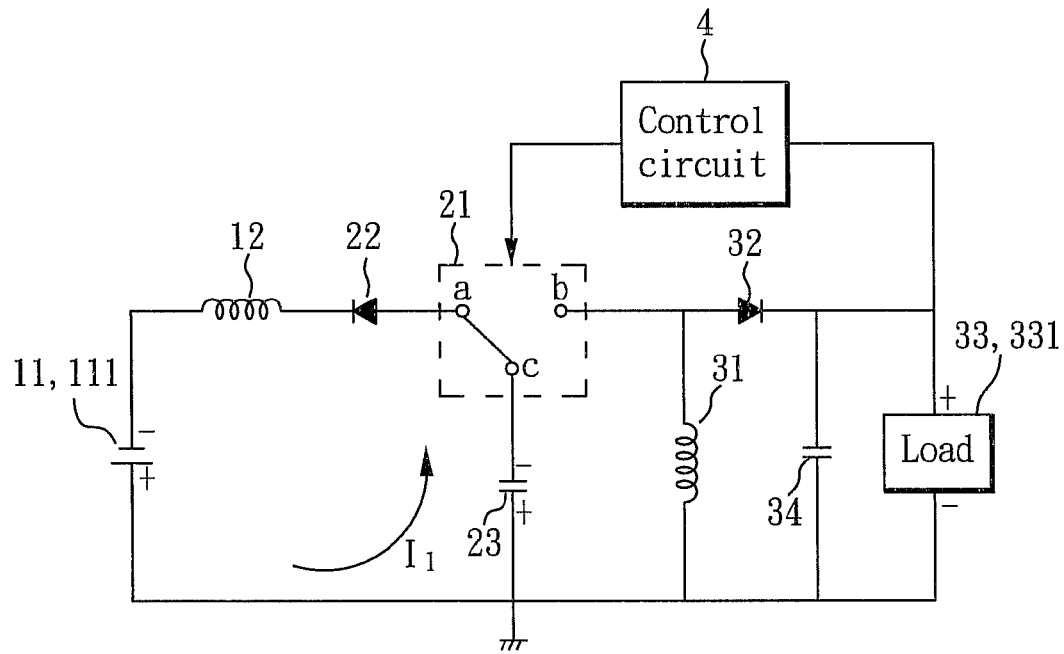
FIG. 3A is a schematic diagram illustrating an operation of the safe electric power regulating circuit according to an embodiment of the invention.
Figure 3B:
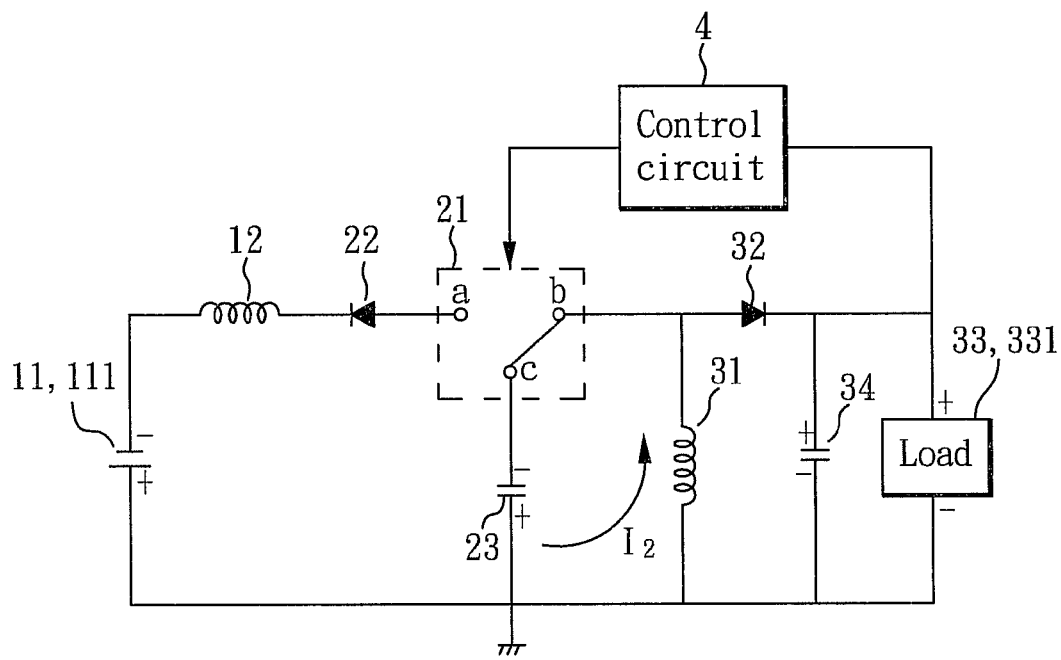
FIG. 3B is a schematic diagram illustrating an operation of the safe electric power regulating circuit according to an embodiment of the invention.
Figure 3C:
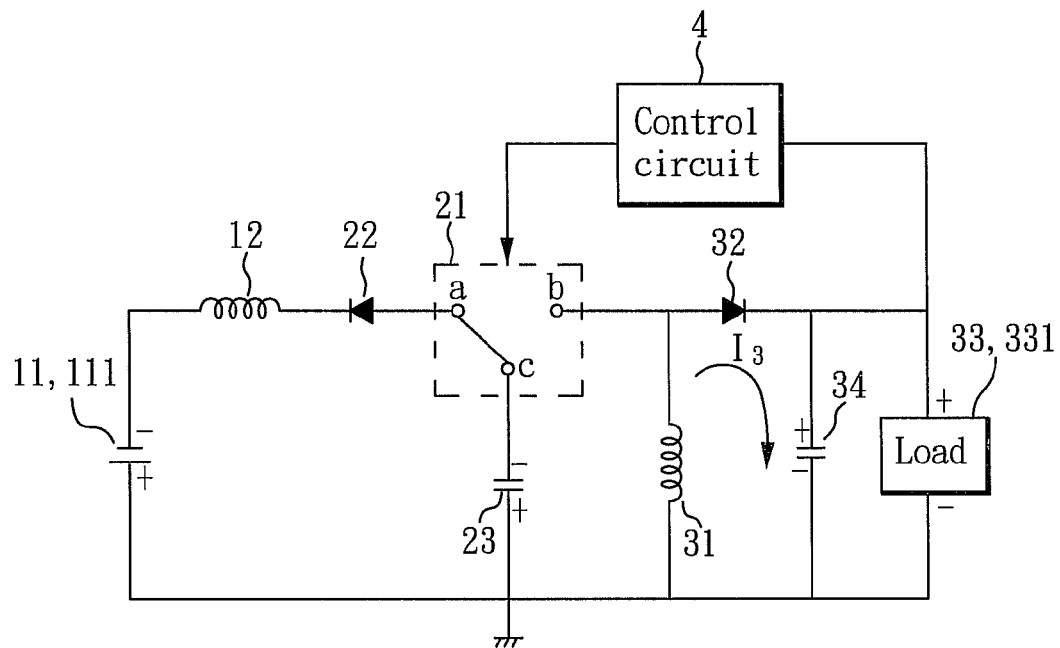
FIG. 3C is a schematic diagram illustrating an operation of the safe electric power regulating circuit according to an embodiment of the invention.
Figure 3D:
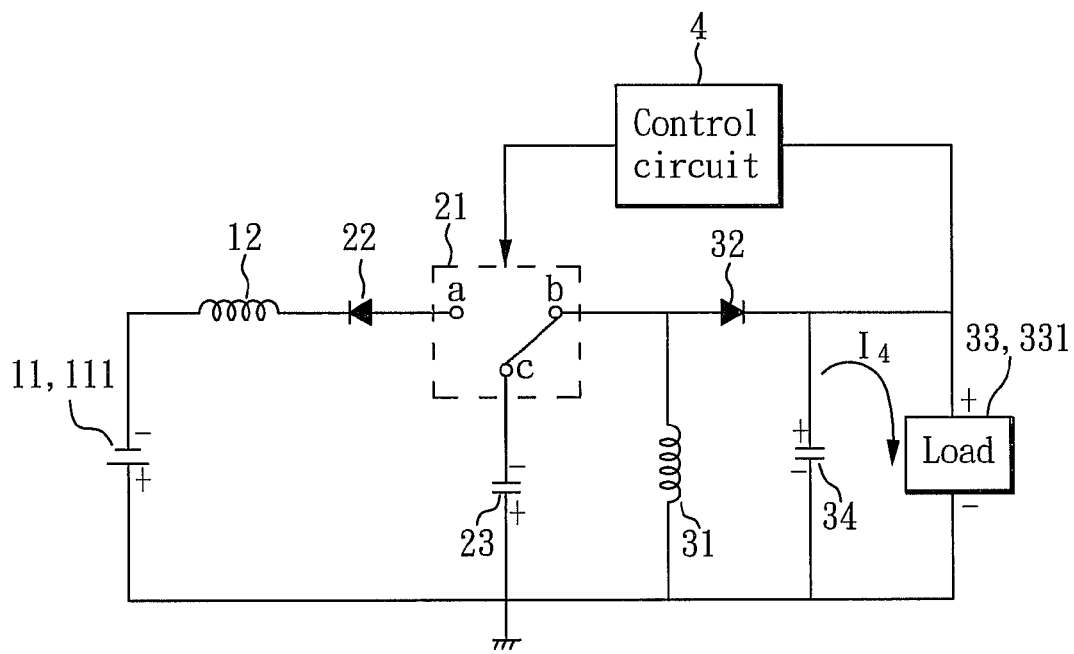
FIG. 3D is a schematic diagram illustrating an operation of the safe electric power regulating circuit according to an embodiment of the invention.

Referring to FIG. 3A, when the control circuit 4 controls the switch unit 21 to connect the third end 'c' to the first end 'a', a corresponding loop is formed to generate a first current $I_1$. Namely, the battery unit 111 charges the first capacitor 23. Next, referring to FIG. 3B, when the control circuit 4 controls the switch unit 21 to connect the third end 'c' to the second end 'b', the stored energy of the first capacitor 23 discharges the corresponding loop to generate a second current $I_2$. Namely, the first capacitor 23 discharges the stored energy to the second inductor 31. Referring to FIG. 3C, the voltage boost/buck circuit 3 further includes a second capacitor 34 having two ends connected to the cathode of the second diode 32 and the circuit ground, respectively. When the second inductor 31 has stored energy, the loop in this case generates a third current $I_3$. Namely, the second inductor 31 discharges the stored energy to the second capacitor 34. In this case, the second diode 32 can limit the direction of the current so as to avoid generating an inverse current flowing from the second capacitor 34 back to the second inductor 31. Referring to FIG. 3D, when the second capacitor 34 stores energy, the loop in this case generates a fourth current $I_4$. Namely, the second capacitor 34 supplies power to the load 331.

The safe electric power regulating circuit 2 transfers the energy provided by the power supply unit 11 to the application unit 33, and the energy of $\frac{1}{2}CV^2$ is transferred when the switch unit 21 performs a switching operation, where C indicates a capacitance of the first capacitor 23 and V indicates a voltage obtained after the power supply unit 11 charges the capacitor 23.

A switching signal output by the control circuit 4 preferably has a switching frequency f. When the switch unit 21 receives the switching signal, the third end 'c' is connected to the first end 'a' or the second end 'b' based on the switching frequency f. The energy transferred is $\frac{1}{2}CV^2 \times f$. Therefore, as the capacitance C of the first capacitor 23 and the voltage V provided by the power supply unit 11 are fixed, the energy transferred by the safe electric power regulating circuit 2 is proportioned to the switching frequency f. Namely, the transferred energy is decided by the switching frequency f, and thus it can be applied to use the switching frequency f of the switch unit 21 to control the energy to be transferred to the application unit 33.

The safe electric power regulating circuit can be implemented between the typical voltage boost/buck circuit and the power supply in order to store the energy provided by the power supply unit in the first capacitor and discharges it from the first capacitor to the application unit. Since the loops at two sides of the switch unit are not connected, the power supply unit does not discharge directly to the application unit. Additionally, the energy transfer occurs only when the switch unit performs a switching operation. When the switching operation of the switch unit is not performed, there is no new energy to be transferred from the power supply unit to the application unit. If a low frequency noise occurs when the control signal is sent, the switch unit is deactivated at most, and there is no new energy transferred to the application unit.

In view of the foregoing, it is known that the safe electric power regulating circuit of the present invention is highly safe. In addition to the effective and safe voltage regulation, the safe electric power regulating circuit can accurately control the magnitude of the energy to be transferred.

Although the present invention has been explained in relation to its preferred embodiment, it is to be understood that many other possible modifications and variations can be made without departing from the spirit and scope of the invention as hereinafter claimed.

What is claimed is:

1. A safe electric power regulating circuit, connected between a power supply and a voltage boost/buck circuit, to regulate the output voltage by the power supply to have a target voltage through the voltage boost/buck circuit, the safe electric power regulating circuit comprising:
    a switch unit having a first end, a second end and a third end, wherein the first end is connected to the power supply, the second end is connected to the voltage boost/buck circuit, and the switching unit is controlled to connect the third end to the first end or the second end;
    a first diode having a first end connected to the first end of the switch unit; and
    a first capacitor having one end connected to the third end of the switch unit and the other end connected to circuit ground;
    wherein the voltage boost/buck circuit comprises:
    an application unit for performing application procedure based on the target voltage;
    a second diode having a first end connected to the second end of the switch unit and a second end connected to the application unit; and
    a second inductor having one end connected to the second end of the switch unit and the first end of the second diode, and the other end connected to circuit ground.

2. The safe electric power regulating circuit as claimed in claim 1, wherein the power supply comprises:

a power supply unit; and a first inductor having two ends respectively connected to the power supply unit and a second end of the first diode.

3. The safe electric power regulating circuit as claimed in claim 2, wherein the power supply unit charges the first capacitor when the switch unit is controlled to connect the third end to the first end.

4. The safe electric power regulating circuit as claimed in claim 1, wherein energy stored in the first capacitor is discharged to the second inductor when the switch unit is controlled to connect between the third end and the second end.

5. The safe electric power regulating circuit as claimed in claim 1, wherein the application unit is a load with two ends respectively connected to the second end of the second diode and the circuit ground.

6. The safe electric power regulating circuit as claimed in claim 5, further comprising a control circuit connected between the load and the switch unit for controlling the switch unit based on a voltage of the load.

7. The safe electric power regulating circuit as claimed in claim 6, wherein the control circuit sends a switching signal to the switch unit, and the switching signal has a switching frequency such that the switch unit is controlled to connect the third end to the first end or the second end based on the switching frequency.

8. The safe electric power regulating circuit as claimed in claim 6, wherein the control circuit is a feedback circuit.

9. The safe electric power regulating circuit as claimed in claim 1, wherein, when the second inductor is stored with energy, the energy is discharged to the application unit.

10. The safe electric power regulating circuit as claimed in claim 1, wherein the voltage boost/buck circuit further comprises a second capacitor with two ends respectively connected to the second end of the second diode and the circuit ground; when the second inductor is stored with energy, the energy is discharged to the second capacitor; when the second capacitor is stored with energy, the energy is discharged to the load.

* * * * *